United States Patent [19]

Naville

[11] Patent Number: 4,789,969

[45] Date of Patent: Dec. 6, 1988

[54] METHOD OF MEASURING THE ANISOTROPY OF PROPAGATION OR REFLECTION OF A TRANSVERSE WAVE, PARTICULARLY A METHOD OF GEOPHYSICAL PROSPECTING BY MEASUREMENT OF THE ANISOTROPY OF PROPAGATION OR OF REFLECTION OF SHEAR WAVES IN ROCKS

[75] Inventor: Charles Naville, Massy, France

[73] Assignee: Compagnie Generale de Geophysique, Massy, France

[21] Appl. No.: 57,279

[22] Filed: Jun. 2, 1987

[30] Foreign Application Priority Data

Jun. 3, 1986 [FR] France ................................ 86 07964

[51] Int. Cl.[4] ................................................ G01V 1/00

[52] U.S. Cl. ......................................... 367/36; 367/37; 367/75; 73/152

[58] Field of Search ........................ 367/36, 37, 43, 46, 367/47, 50, 56, 57, 75, 31; 181/108, 111, 112, 113; 73/152, 574, 584, 645

[56] References Cited

U.S. PATENT DOCUMENTS

| | | | |
|---|---|---|---|
| 3,003,577 | 10/1961 | Itria | 367/75 |
| 3,622,965 | 11/1971 | Wu | 367/47 |
| 3,946,598 | 3/1976 | Towne et al. | 73/574 |
| 4,080,836 | 3/1978 | Thompson et al. | 73/597 |
| 4,138,894 | 2/1979 | Robert et al. | 73/645 |
| 4,501,150 | 2/1985 | Rouge | 73/645 |
| 4,648,039 | 3/1987 | Devaney et al. | 364/421 |
| 4,713,968 | 12/1987 | Yale | 73/152 |

FOREIGN PATENT DOCUMENTS 0169076 7/1985 European Pat. Off. .

OTHER PUBLICATIONS

"Ultrasonic SH Wave Velocity in Textured Aluminum Plates", Ultrasonics, vol. 23, No. 5, Sep. 1985, Allen, Langman, and Sayers.

"Investigation of Shear Waves", by R. N. Jolly, Geophysics, vol. 21, pp. 908–919, 926–938.

"The Anisotropic Distortion of Reflection Seismic Sections", by Mason, Worthington and Smith; 51st Ann. Int. Seq. Mtg. Tech, Pap. #5172 (1981).

"Acoustical Polarameter" by Rouge, 1982 Ultrasonics Symposium Proceedings, vol. 2, pp. 861–863, Oct. 27–29, 1982.

"The detection of Liquids and Viscoelastic Substances Trapped Under Solid Surfaces" by Jones et al., Journal of the Acoustical Society of American, vol. 79, No. 1, Jan. 1986.

*Primary Examiner*—Charles T. Jordan
*Assistant Examiner*—John W. Eldred
*Attorney, Agent, or Firm*—Blakely, Sokoloff, Taylor & Zafman

[57] ABSTRACT

The invention permits the measurement of the propagation anisotropy of a transverse wave between two given reference points of a non-isotropic medium (M), particularly a shear wave in a stratified or fissured rock.

According to the invention: a source (S) and two detectors ($G_1$, $G_2$) are arranged along a single ray vector, the detectors being positioned at the location of respective reference points; the source is excited by an excitation signal producing a transverse wave in the medium; the respective resultant measurement signals produced by each of the detectors are received; from the excitation signal and the measurement signals the transfer function of the medium along each of the respective source-detector paths is determined; the differential transfer function of the medium between the two reference points is deduced.

Other configurations can also be provided, particularly two sources and one detector, or the method can be applied to seismic reflection with waves having an oblique incidence or even a zero incidence.

7 Claims, 1 Drawing Sheet

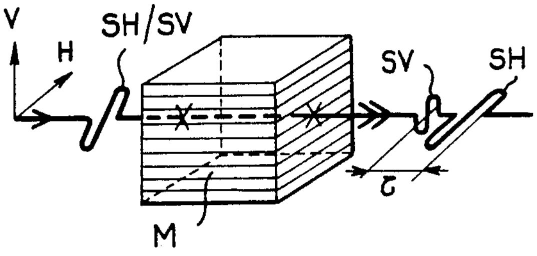
FIG_1
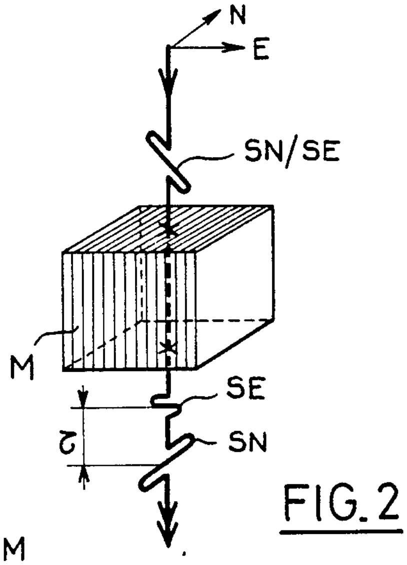
FIG_2
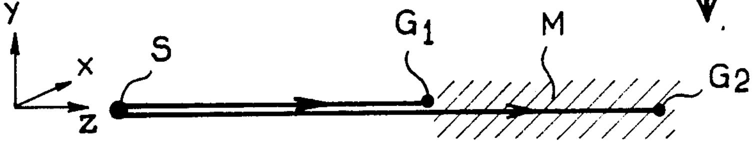
FIG_3
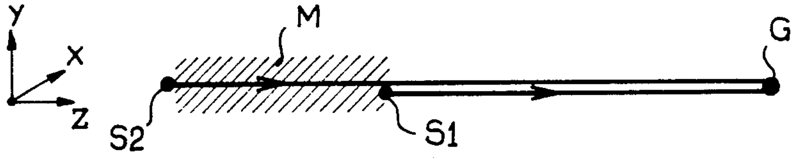
FIG_4
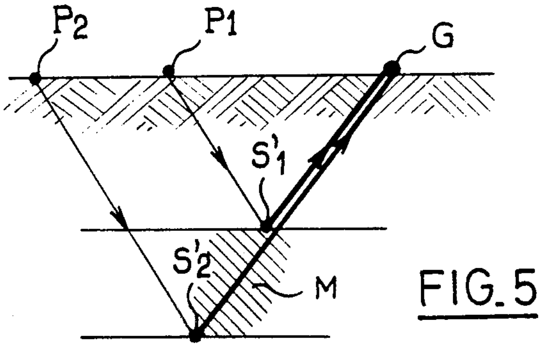
FIG_5
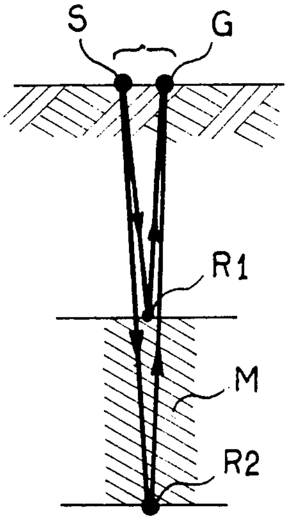
FIG_6
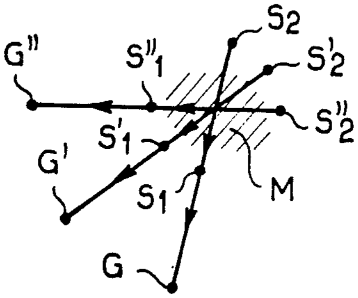
FIG_7

METHOD OF MEASURING THE ANISOTROPY OF PROPAGATION OR REFLECTION OF A TRANSVERSE WAVE, PARTICULARLY A METHOD OF GEOPHYSICAL PROSPECTING BY MEASUREMENT OF THE ANISOTROPY OF PROPAGATION OR OF REFLECTION OF SHEAR WAVES IN ROCKS

FIELD OF THE INVENTION

The present invention relates to a method of measurement of anisotropy of propagation of a transverse wave between two given reference points of a non-isotropic medium to be studied.

The invention can also be applied to the measurement of an anisotropy of reflection of a transverse wave at a given reference point, appropriate for creating a non-isotropic reflection of the transverse wave, in a substantially isotropic medium.

BACKGROUND OF THE INVENTION

The application of this method to geophysical prospecting by measurement of the anisotropy of propagation or reflection of shear waves in rocks will be more particularly described; nevertheless, this application is no way limitative, and the method of the invention can be applied to numerous very different fields of measurement where it can be employed each time that there is present a progressive wave having transverse components: such is particularly the case of an electro-magnetic wave, or an acoustic wave propagating in a solid medium (or comparable to a solid), which permits application of the invention to radar, sonar and medical imaging techniques.

In other words, the method of the invention is able to be applied, in a general manner, each time that there is present a medium which propagates shear waves or the like waves in a non-isotropic manner, or even an isotropic medium, when a reflection produces an anisotropy.

The phenomenon of an anisotropy of propagation of a transverse wave will first be explained taking as an example the case of propagation of a shear wave in a rock, with reference to FIGS. 1 and 2.

The phenomenon of an anisotropy of propagation of a shear wave—often designated "S wave" (for "shear" wave) is typical of fissured or stratified materials, and the study of propagation of shear waves in these materials gives valuable indications of the structure of the medium traversed.

In FIG. 1, there is illustrated an incident shear wave SH/SV having for example an orientation of 45° with respect to the horizontal, then having components both in the vertical direction V and in the horizontal direction H. This incident wave penetrates into a stratified, anisotropic medium M, which creates a phenomenon of discrimination of the shear waves ("shear-wave splitting") along the propagation path: the vertical and horizontal components are propagated with different polarisations, speeds and attenuations in the medium M, thus producing, from the same incident wave SV/SH, two resultant waves SV and SH, respectively polarised vertically and horizontally, having a time displacement $\tau$. Thus, the wave form, which is the vectorial sum of the two components SV and SH, gradually becomes modified during its propagation across an anisotropic medium.

In the same manner, FIG. 2 illustrates the propagation of a shear wave SN/SE propagating along a substantially vertical ray vecter, and having components both in a North direction N and an East direction E. This incident wave SN/SE penetrates into an anisotropic medium M having fissuring oriented for example in the North-South direction. As in the previous case, the two components North SN and East SE of the incident wave are propagated at different speeds because of the anisotropy, gradually modifying the form of the wave and creating a time displacement $\tau$. The component propagating the fastest is that which is polarised parallel to the fissure faces (that is to say in the North-South direction, in the example chosen); further, this component is only slightly attenuated. On the other hand, the East-West oriented component is propagated more slowly and experiences a strong attenuation.

Study of the anisotropy of the medium then comprises study of the following parameters:

finding the orientations respectively corresponding to the smallest and greatest speed of propagation (finding the principal directions of anisotropy), which permits evaluation of the orientation of the fissures, which will be perpendicular to the direction of minimum horizontal compression;

the time displacement $\tau$ between the components corresponding to the two principal directions of anisotropy;

measurement of the attenuation of the different components, particularly their differential attenuation in the two principal directions of anisotropy.

This will provide indications of the nature of the medium traversed and permit quantification of the importance of the anisotropy, furnishing also an indication of the density of fracturing or the porosity of the medium traversed.

The Invention

The present invention has more precisely the object of proposing a method permitting determination of these different parameters, whilst using a conventional apparatus (shear wave generator, omnidirectional two or three component geophones, . . . ) and by application of normal seismic methods (seismic reflection or seismic shafts).

The invention is essentially based on the differential effect of propagation of shear waves along two measuring paths along the same ray vector, that is to say along two paths of which one completely retraces the other.

Application of the method of the invention supposes that, except for reflections, the propagation is carried out in a substantially linear manner, which is generally the case met during seismology in a rocky medium.

More precisely, according to the invention, for measuring the anisotropy of propagation of a transverse wave between two given reference points of a non-isotropic medium to be studied, according to a first embodiment:

source and two detectors are arranged along the same ray vector, the detectors being positioned at the location of respective reference points, the sources excited by an excitation signal producing a transverse wave in the medium, the respective resultant measurement signals produced by each of the detectors is received, from the excitation signal and the two measurement signals, the transfer function of the medium along each of the two respective source detector paths is determined, the differential transfer function of the medium between the two reference points is deduced.

This hypothesis is applied particularly to the seismology of shafts, the direction of the ray vector being the direction of drilling of the shafts (in the "VSP" or "PSV" technique: Vertical Seismic Profile).

In a second embodiment:

two sources and a detector are arranged along the same ray vector, the sources being positioned at the location of respective reference points, the sources are excited by respective excitation signals producing transverse waves in the medium, the respective resultant measurement signals produced by the detector are received, from the excitation signals and the measurement signals, the transfer function of the medium along each of the two respective source-detector paths is determined, the differential transfer function of the medium between the two reference points is deduced.

In this latter case, the sources can as well as being actual sources (generators of shear waves) be virtual sources positioned each at a point of reflection of an incident wave produced by a distant actual source.

The distant actual sources can be in particular sources of compression waves, so that the incident wave is a longitudinal wave producing transverse wave components after reflection. This permits freeing from the effects of anisotropy of propagation of the transverse wave from the traversed medium between the actual sources and the virtual sources.

This latter hypothesis is more particularly applied to seismic reflection, with a configuration in which the detector is situated at a distance from the sources, the incident and reflected waves propagating obliquely with respect to the vertical.

In the third embodiment:

a source and a detector are arranged in propagation alignment with two points of reference, the source is excited by an excitation signal producing a transverse wave in the medium, in a manner such that this wave propagates along the same ray vector in a first direction as far as two points of reference, this wave is then reflected at each of the points of reference and, returning, propagates along the said ray vector in the reverse direction as far as the detector, respective resultant measurement signals produced by the detector are received, the transfer function of the medium along each of the two respective source-point of reference-detector paths is determined, the differential transfer function of the medium between the two points of reference is deduced.

This hypothesis is particularly applied in the case of seismic shafts reflection with the source and detector situated on the same vertical (either at the same point or otherwise), a configuration in which the waves propagate vertically and are subject to reflection at locations situated vertically with respect to this point.

As indicated above, the invention is applicable also to the measurement of anisotropy of reflection of a transverse wave at a given reference point, appropriate for creating a non-isotropic reflection of a transverse wave, in a substantially isotropic medium.

In this case, according to the invention:

a source and a detector are arranged in propagation alignment with the point of reference, the source is excited by an excitation signal producing a transverse wave in the medium, in a manner such that this wave propagates along the length of the ray vector in a first direction as far as the reference point, where it is reflected and, returning, propagates along the length of the ray vector in the reverse direction to the detector, the respective resultant measurement signals produced by the detector are received, the transfer function from the reflector to the point of reference is determined.

The Drawings

Other characteristics and advantages of the invention will be explained in the detailed description which follows of different embodiments, with reference to the accompanying drawings, in which:

FIGS. 1 and 2, already mentioned, illustrate the phenomenon of an anisotropy of propagation of a transverse wave in a non-isotropic medium, FIG. 3 illustrates the first embodiment of the invention, FIG. 4 illustrates the second embodiment of the invention, in which the sources are actual sources, FIG. 5 illustrates a variant of the preceding embodiment, in which the sources of shear waves are virtual sources, FIG. 6 illustrates the third embodiment of the invention, and FIG. 7 illustrates the successive measurements operated for obtaining a three-dimensional image of the anisotropy of the medium.

The First Embodiment

In FIG. 3, the reference S designates a source of shear waves, and $G_1$ and $G_2$ two geophones, the members S, $G_1$ and $G_2$ being aligned along the length of a substantially rectilinear propagation path.

This path is for example vertical, the study hypothesis then being that of FIG. 2. In this configuration, the axis Z is then the vertical (or the direction of boring of a shaft), the members S, $G_1$ and $G_2$ being for example positioned at different levels in the same shafts, and the medium M to be studied being then situated between the two geophones $G_1$ and $G_2$.

Further, S and $G_1$ can possibly be coincident.

The wave produced by the source S will be a shear wave having its components $S_X$ and $S_Y$ in the horizontal plane (X,Y) normal to the propagation direction Z.

The signal expressed in matrix form received by the geophone $G_1$ will be:

$$\begin{pmatrix} X_1 \\ Y_1 \end{pmatrix} = F(S,G_1) \begin{pmatrix} S_X \\ S_Y \end{pmatrix} \quad \text{(I)}$$

$F(S,G_1)$ being the transfer function (matrix operator of dimension (2,2)) between S and $G_1$.

In the same way, the signal received by the geophone $G_2$ will be:

$$\begin{pmatrix} X_2 \\ Y_2 \end{pmatrix} = F(G_1,G_2) * F(S,G_1) \begin{pmatrix} S_X \\ S_Y \end{pmatrix} \quad \text{(II)}$$

$F(G_1,G_2)$ being the transfer function of the medium M between $G_1$ and $G_2$, and * being the convolution operator, where:

$$\begin{pmatrix} X_2 \\ Y_2 \end{pmatrix} = F(G_1,G_2) \begin{pmatrix} X_1 \\ Y_1 \end{pmatrix} \quad \text{(IIbis)}$$

It is thus possible to determine the transfer function $F(G_1,G_2)$ from the measurements $(X_1,Y_1)$ and $(X_2,Y_2)$ taken at the points $G_1$ and $G_2$.

The signals from the source and the geophones are of course expressed in the same fixed geographic frame of reference (X,Y).

The transfer function $F(G_1,G_2)$, which is the function to be determined for evaluating the anisotropy of the medium M between $G_1$ and $G_2$, is of the following form (after Fourier transformation):

$$F(G_1,G_2) = K\,P^{-1} \begin{pmatrix} Q_1 \exp(i\omega\tau_1) & 0 \\ 0 & Q_2 \exp(i\omega\tau_2) \end{pmatrix} P \quad \text{(III)}$$

which can also be expressed in the form:

$$F(G_1,G_2) = K'\,P^{-1} \begin{pmatrix} 1 & 0 \\ 0 & \frac{Q_2}{Q_1} \exp[i\omega(\tau_2 - \tau_1)] \end{pmatrix} P \quad \text{(IIIbis)}$$

P being the passage matrix for the fixed frame of reference (X,Y) to the frame of reference (orthogonal or otherwise) of the two principal shear waves, $(\tau_2-\tau_1)$ being the time displacement between the components corresponding to the two principal directions of anisotropy between the points $G_1$ and $G_2$, $Q_2/Q_1$ being the relative attenuation of the components in the two principal directions of anisotropy, K and K' being isotrope transmission filters.

The two principal directions of anisotropy are determined in using for $G_1$ and $G_2$ omnidirectional geophones which respond on three axes (or, at least, on two axes, if the geophone can be oriented in a precise manner with respect to the direction of the ray vector), and finding the direction on which the signal arrives first and experiences the least attenuation.

Having thus determined P, it is possible to work out the transfer function deduced from the measurements taken at the points $G_1$ and $G_2$ the parameters $\tau_2-\tau_1$ and $Q_2/Q_1$ permitting quantification of the anisotropy of the medium M.

In the case of a P/S conversion of transmission (conversion from a pressure or longitudinal wave to a shear or transverse wave at the interface between two different media), a virtual source can be simulated at $G_1$, there or where the conversion is produced. As the direction of polarisation of the wave P before conversion is known, it is possible to calculate the tensor $F(G_1,G_2)$ from the expression (IIbis).

The Second Embodiment

FIG. 4 illustrates a second embodiment of the method: in this case, in place of arranging a source and two geophones along the same ray vector, two sources $S_2$ and $S_1$ and a single geophone G are arranged, the object being to study the anisotropy of the medium M situated between the two sources $S_1$ and $S_2$.

The other hypotheses are the same as in the case of FIG. 3.

The geophone G at first receives a first shear wave coming from the source $S_1$ (of which the orientation and amplitude of its components are known), which produces the following response:

$$\begin{pmatrix} X_1 \\ Y_1 \end{pmatrix} = F(S_1,G) \begin{pmatrix} S_{X1} \\ S_{Y1} \end{pmatrix} \quad \text{(IV)}$$

This expression permits calculation of component $F(S_1,G)$ if the source is not polarised linearly in a single direction.

Similarly, the geophone will receive the wave emitted by the source $S_2$, which will have traversed the medium M between $S_2$ and $S_1$, as well as the medium between $S_1$ and G. The received signal can be expressed by:

$$\begin{pmatrix} X_2 \\ Y_2 \end{pmatrix} = F(S_1,G) * F(S_2,S_1) \begin{pmatrix} S_{X2} \\ S_{Y2} \end{pmatrix} \quad \text{(V)}$$

Taking account of the fact that $F(S_1,G)$ is known, this expression can also be put in the form:

$$F^{-1}(S_1,G) \begin{pmatrix} X_2 \\ Y_2 \end{pmatrix} = F(S_2,S_1) \begin{pmatrix} S_{X2} \\ S_{Y2} \end{pmatrix} \quad \text{(Vbis)}$$

The operator found $F(S_2,S_1)$ which is itself of the form (III) to a first approximation can now be deduced.

The configuration corresponding to this embodiment (that is to say two sources and one geophone) is applicable in a very advantageous manner to seismic reflection, in which the two dimensional profile of reflected P/S converted waves is studied, that is to say where pressure or longitudinal waves are emitted, without shear components, which are transformed after—and only after—reflection as waves having shear components.

Preferably the "Wide Line Profiling" WLP technique will be used or three-dimensional seismic studies for emitting a virtual signal from the source as an S wave, polarised linearly in several successive directions.

This configuration has been illustrated in FIG. 5, with thin lines representing pressure or longitudinal waves, and thick lines representing shear or transverse waves.

The two pressure waves created by the sources $P_1$ and $P_2$ propagate parallel as far as points $S'_1$ and $S'_2$ where a reflection is generated of components of a shear wave. One thus returns to the case of FIG. 4, the actual sources $S_1$ and $S_2$ being replaced by two virtual sources $S'_1$ and $S'_2$, and the medium to be studied being the medium M between the two points of reference, that is to say in fact between two stratification interfaces of the rock, whence the interest of this configuration.

The fact that, between the actual sources and the virtual sources, the waves propagate only in a longitudinal manner, permits elimination of any influence of anisotropy of the medium between $P_1$ and $S'_1$ on the one hand and $P_2$ and $S'_2$ on the other hand, anisotropy which is all the more annoying because the two waves are not propagating on the same ray vector; on the other hand, the influence of anisotropy of the medium will be significant along the path between $S'_2$, $S'_1$ and G, and it has been shown above how it is possible to determine and eliminate the influence of the anisotropy of the medium between $S'_1$ and G.

The Third Embodiment

FIG. 6 illustrates a third embodiment of the invention, in which the shear wave propagates at normal incidence (vertical or otherwise) to the reflectors, in a manner to study the reflections being produced at points $R_1$ and $R_2$ situated on the same double path where the source S and the geophone G are both situated.

The source S and the geophone G can be, as illustrated, situated at the same point; they can equally well be at different points, but always situated in alignment with $R_1$ and $R_2$ (for example at two different levels of a bored shaft in the direction of $R_1$ and $R_2$).

As it is no longer possible, as a result of the normal incidence, to obtain a conversion wave of the pressure wave to a shear wave, the source S must be a shear wave source. The two outwards-return paths will be the paths S $R_1$ G on the one hand and S $R_2$ G on the other hand.

Knowing the signal ($S_X$, $S_Y$) emitted by the source and the signal received by the one geophone, it is a question of determining the characteristics of anisotropy of the medium M situated between the two reflection points $R_1$ and $R_2$.

The signal received at G following the shear wave on the first path S $R_1$ G is:

$$\begin{pmatrix} X_1 \\ Y_1 \end{pmatrix} = F(R_1,S) * F(S,R_1) * K_1 \begin{pmatrix} S_X \\ S_Y \end{pmatrix} \quad \text{(VI)}$$

In the same way, the signal received from the second path S $R_2$ G is:

$$\begin{pmatrix} X_2 \\ Y_2 \end{pmatrix} = F(R_1,S)*F(R_2,R_1)*F(R_1,R_2)*F(S,R_1)*K_2 \begin{pmatrix} S_X \\ S_Y \end{pmatrix} \quad \text{(VII)}$$

$K_1$ and $K_2$ are single dimension operators representative of the stratification, that is to say of the parameters without incidence on the polarisation of the wave: reflections (supposedly isotropic) at $R_1$ and $R_2$ and transmissions (also supposed isotropic) from $S_1$ to $R_2$, and from $R_1$ to G.

The operator found is the convolution product:

$$F(R_2,R_1) * F(R_1,R_2) \quad \text{(VIII)}$$

This expression is of the form:

$$K\,P^{-1} \begin{pmatrix} Q_1^2 \exp(2i\omega\tau_1) & 0 \\ 0 & Q_2^2 \exp(2i\omega\tau_2) \end{pmatrix} P \quad \text{(IX)}$$

a form analagous to the expression (III) evaluated in the preceding cases, since one will have been able preliminarily to determine the transfer function F $(S,R_1)$.

If, between $R_1$ and S, the two principal directions of anisotropy are at a right angle in each of the media traversed, one will have:

$$F(S,R_1) = {}^{T}F(R_1,S) \quad \text{(X)}$$

This permits easy calculation of $F(S,R_1)$ knowing the product:

$$F(R_1,S) * {}^{T}F(S,R_1) \quad \text{(XI)}$$

determined from two measurements with the source S in two different directions. This determination can for example be obtained by the Cayley factorisation method.

In the contrary case, it is necessary to proceed step by step and preliminarily determine the anisotropy in each of n media traversed between S and $R_1$, in a manner to establish:

$$F(S,R_1) = \prod_{k=1}^{n} K_k P_k^{-1} \begin{pmatrix} Q_{1k}\exp(i\omega\tau_{1k}) & 0 \\ 0 & Q_{2k}^2\exp(i\omega\tau_{2k}) \end{pmatrix} P_k \quad \text{(XII)}$$

in order to be able to deduce $F(R_2,R_1)$ in the expression IX.

In the configuration of FIG. 6 with $R_1$ and $R_2$ coincident (that is to say an outwards-return path along the same path), it is possible to apply the invention to determining any anisotropy due to the reflection of the point $R_1/R_2$, the propagation of shear waves then being supposed substantially isotropic in the medium traversed between S and $R_1/R_2$.

If the medium is anisotropic, one can also determine preliminarily its anisotropy thanks to fixed known isotropic reflections (a method particularly useful in radar techniques).

Finally, the following remarks can be made:

it is possible to multiply the directions for having a three-dimensional image of anisotropy as illustrated in FIG. 7: by placing for example in the configuration with two sources and one geophone, the ray vector is turned in a manner to make the shear wave propagate in several directions in the medium M;

in the examples described above, sources and geophones places in a shaft or indeed on the surface have been envisaged. This difference is without any significance on the operation of the method, and it is possible to envisage all possible combinations in the same configuration (sources in shafts and geophones on the surface, etc.);

a preliminary calibration of the geophones and of the sources can be necessary, for determining both the anisotropy appropriate to the instrument and the anisotropy of instrument-rock coupling (particularly in the case of a coupling by a shaft tool applying the source or the geophone against a point of the cylindrical wall of the shaft).

I claim:

1. A method of measuring anisotropy of propagation of a transverse wave between two given reference points of a non-isotropic medium to be studied, particularly a method of geophysical prospecting by measurement of anisotropy of propagation of shear waves in rocks, wherein: a source and two detectors are arranged along a ray vector, said detectors being positioned at said respective points of reference, said source is excited by an excitation signal producing a transverse wave in said medium, respective resultant measurement signals produced by each of said detectors are received, from said excitation signal and said measurement signals, a transfer function for said medium along each of said two respective source-detector paths is determined, a differential transfer function of said medium is deduced between said two points of reference.

2. A method of measurement of anisotropy of propagation of a transverse wave between two given reference points of a non-isotropic medium to be studied, particularly a method of geophysical prospecting by measurement of anisotropy of propagation of shear waves in rocks, wherein:

two sources and a detector are arranged along a single ray vector, said sources being placed at the location of said respective points of reference, said sources are excited by respective excitation signals producing transverse waves in said medium, respective resultant measurement signals produced by said detector are received, from said excitation signals and said measurement signals, a transfer function of said medium along each of said two respective source-detector paths is determined, a differential transfer function referred to as the anisotropic shear wave transfer function of said medium for propagation between said two points of reference is deduced.

3. A method according to claim 2, in which said sources are actual sources.

4. A method according to claim 2, in which said sources are virtual sources each situated at a point of reflection of an incident wave produced by a distant actual source.

5. A method according to claim 4, in which said incident wave is a longitudinal wave producing transverse wave components after reflection.

6. A method of measuring anisotropy of the propagation of a transverse wave between two given reference points, located on the same propagation path and referred to as mirror points, appropriate for creating substantially isotropic reflections from a transverse wave of a non-isotropic medium to be studied, particularly a method of geophysical prospecting by measurement of anisotropy of propagation of shear waves in rocks, wherein:

a source and a detector are arranged on the same path as said two mirror points, said source is activated by an excitation signal producing a transverse wave in said medium, in a manner such that said wave propagates along a single ray vector in a first direction as far as said two mirror points, said wave being then reflected at each of said points of reference and propagating back along said ray vector in the opposite direction as far as said detector, respective result and measurement signals produced by said detector are received, a transfer function referred to as the anisotropic shear wave transfer function of said medium along each of said two respective source-point of reference-detector paths is determined a differential transfer function of said medium between said two points of reference is deduced.

7. A method of measurement of anisotropy of reflection of a transverse wave at a given point of reference referred to as mirror point, appropriate for creating a non-isotropic reflection of said transverse wave, in a substantially isotropic medium, particularly a method of geophysical prospecting by measurement of anisotropy of reflection of shear waves in rocks, wherein:

a source and a detector are arranged on the same propagation path as said mirror point, said source is excited by an excitation signal producing a transverse wave in said medium, in a manner such that said wave propagates along a ray vector in a first direction as far as said point of reference, where it is reflected and it propagates back along said ray vector in the reverse direction as far as said detector, respective result and measurement signals produced by said detector are received by said detector, a transfer function referred to as the anisotropic shear wave transfer function for said reflector at said mirror point is determined.

* * * * *

UNITED STATES PATENT AND TRADEMARK OFFICE

CERTIFICATE OF CORRECTION

PATENT NO. : 4,789,969

DATED : 12-6-88

INVENTOR(S) : Naville

It is certified that error appears in the above-identified patent and that said Letters Patent is hereby corrected as shown below:

| Column | Line | Correction |
|---|---|---|
| 8 | 20-22 | delete " $F(S,R_1) = \overset{n}{\underset{k=1}{}}$ ", insert -- $F(S,R_1) = \prod_{k=1}^{n}$ -- |
| 8 | 17 | delete "n", insert --n-- |

Signed and Sealed this

Twenty-second Day of August, 1989

*Attest:*

DONALD J. QUIGG

*Attesting Officer* *Commissioner of Patents and Trademarks*